United States Patent [19]

Patterson

[11] Patent Number: 4,495,237
[45] Date of Patent: Jan. 22, 1985

[54] PYRAMIDAL CORE STRUCTURE

[76] Inventor: Fred R. Patterson, 303 Huntingdon Rd., Union, N.J. 07083

[21] Appl. No.: 503,238

[22] Filed: Jun. 10, 1983

[51] Int. Cl.³ .............................................. B32B 3/30
[52] U.S. Cl. .................................. 428/178; 428/180; 428/71; 156/291
[58] Field of Search .................... 428/180, 178, 71; 156/291

[56] References Cited

U.S. PATENT DOCUMENTS 3,689,345 9/1972 Figge et al. ..................... 428/116 X
4,348,442 9/1982 Figge .............................. 428/76 X

FOREIGN PATENT DOCUMENTS 498839 2/1951 Belgium ............................. 428/178

Primary Examiner—Alexander S. Thomas
Attorney, Agent, or Firm—Richard L. Miller

[57] ABSTRACT

A pyramidal core structure is provided and consists of two panels. Each panel is comprised of a series of beveled, truncated hollow pyramids embossed thereon. One of the panels can be inverted and mated with the other panel in an appropriate manner to form a core structure. The core structure so formed is normally bonded to two sheets for added strength and utility.

9 Claims, 5 Drawing Figures

U.S. Patent  Jan. 22, 1985  4,495,237
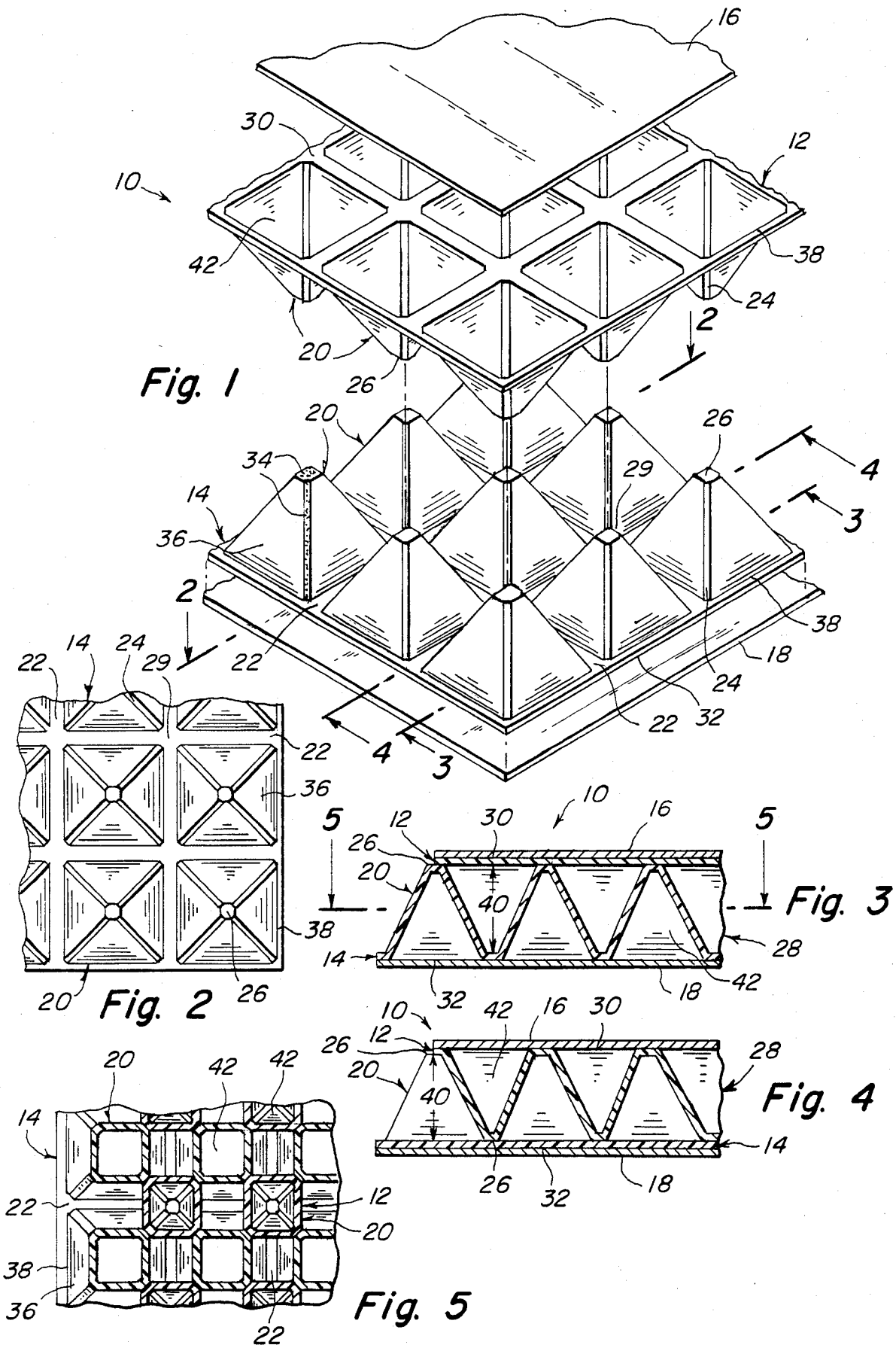

PYRAMIDAL CORE STRUCTURE

BACKGROUND OF THE INVENTION

The instant invention relates generally to structural members and more specifically it relates to a pyramidal core structure capable of supporting loads and distributing stresses in such a manner as to closely approximate stress distribution in a solid panel.

Numerous structural members have been provided in prior art that are adapted to support loads and resists stresses. For example, U.S. Pat. Nos. 3,108,924; 3,849,237 and 3,906,571 are all illustrative of such prior art. While these units may be suitable for the particular purpose to which they address, they would not be as suitable for the purposes of the present invention as heretofore described.

SUMMARY OF THE INVENTION

A principle object of the present invention is to provide a pyramidal core structure that is comprised of a series of beveled, truncated pyramids embossed on a single panel with a corresponding panel attached by appropriate means to form a structure capable of distributing stresses in such a manner as to increase the strength to weight ratio of the core structure of any suitable materials capable of being formed and bonded.

Another object is to provide a pyramidal core structure that is normally bonded to exterior sheets for added strength and utility.

An additional object is to provide a pyramidal core structure that can be formed in simple, compound and complex curves.

A still additional object is to provide a pyramidal core structure that can be formed of varying thicknesses along both longitudinal and lateral axes.

A further object is to provide a pyramidal core structure that is simple and easy to use.

A still further object is to provide a pyramidal core structure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is an exploded perspective view of the invention.

FIG. 2 is a top plan view of the lower embossed member taken on line 2—2 in FIG. 1.

FIG. 3 is a cross sectional view taken through the apexes of a row of pyramids in the lower illustrated embossed member on line 3—3 in FIG. 1 showing the invention assembled.

FIG. 4 is a cross sectional view taken between a row of pyramids in the lower illustrated embossed member on line 4—4 in FIG. 1 showing the invention assembled.

FIG. 5 is a cross sectional view taken on line 5—5 in FIG. 3.

DESCRIPTION OF THE PREFERRED EMBODIMENT

Turning now descriptively to the drawings, in which similar reference characters denote similar elements throughout the several views, FIGS. 1 through 5 illustrate a pyramidal core structure 10. The structure 10 consists of two substantially identical panels 12 and 14 and two sheets 16 and 18.

Each panel 12 and 14 has continuous hollow pyramidal shapes 20 embossed in both longitudinal and latitudinal directions with narrow channels 22 between them. Each of the pyramid shapes 20 have slightly beveled edges 24 and a slightly truncated top 26. Panel 12 can be inverted and mated with panel 14 in an appropriate manner with beveled edges 24 engaging each other and truncated top 26 engaging intersections of the narrow channels 22 to form a core structure 28 as best shown in FIGS. 3 and 4. Each sheet 16 and 18 is in engagement with an opposite exterior surface 30 and 32 of the core structure 28.

Adhesive material 34 such as glue, is used for integrally bonding the two panels 12 and 14 together along the beveled edges 24 and truncated tops 26 so as to form a composite integral structure. The adhesive material 34 is also used for integrally bonding the two sheets 16 and 18 to the core structure 28 so as to form a complete structural panel providing a simple way of construction and a high strength to weight ratio member for any given material used.

The pyramid shaped 20 are formed in each panel 12 and 14 depending on material and usage by either compression, injection, vacuum molding, die forming, dip molding, spray molding and any other method that will result in the basic form.

While this core structure is illustrated for fabricating a flat surface it is to be noted that this core structure 28 can also be formed in simple, compound, and/or complex curved surface with the core structure 28 being of uniform thickness by changing face angles and size and shape of the pyramid bases 38 in proportionate carefully chosen amounts as the geometry of the shape of the surface may require.

The face angles of the pyramids 20 are not critical and neither is the amount of truncation with the exception that strength to weight ratios rapidly decrease when departing from the optimum of approximately 60 degrees and specific minimum truncation for bonding requirements. Certain requirements and reinforcing may require changing that angle for optimum utilization. The width of the bevel on the edges 24 of the pyramid 20 and the channels 22 should usually be no more than that required for adequate bonding of the materials. The thickness and curvature of the core structure 28 may be varied by changing the face angles, 36, the size and shape of the pyramid bases 38 and the altitude 40 of the pyramids 20, as is obvious from the geometry involved.

Glass fillers, wire mesh, reinforcing rods and bars (not shown) can be used in conjunction with the core structure 28 as stress requirements dictate where certain applications and materials require need of it, as is well known in the art. Foam of low thermal conductivity (not shown) may be filled within voids 42 of the core structure 28 to provide thermal insulation thereof.

The materials used may be metals (particularly steel and aluminum), plastics, paper, cementitious type materials, graphite or other composites. A flat or curved sheet 16 and 18 as appropriate, may be bonded to each side of the core structure 28. Depending on the usage of the structural panel, the materials used for such sheeting may be of the same material as the core structure 28 or dissimilar. Decorative design can be employed in the sheeting 16 and 18 as a part of the forming process or by adding an appropriate covering. It can be seen from the foregoing that the instant invention provides a simple and cost effective means of increasing strength to weight ratio in a broad range of materials and for a broad number of applications. Due to the inherent flexibility of the design, it should prove useful in the construction of houses, aircraft, rigid airships, ships, submersibles, spacecraft, automobiles and trucks, to name a few.

While certain novel featurs of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pyramidal core structure which comprises:
   (a) two substantially identical panels, each said panel having continuous hollow pyramid shapes embossed in both longitudinal and latitudinal directions to define four-sided embossments projecting from the panels with orthogonal narrow channels between them crossing at intersections, each of the pyramid shapes having slightly beveled edges at all four corners and a slightly truncated top so that one of said panels can be inverted and mated in either of two orthogonal directions with the other of said panels in an appropriate manner to form a core structure; and,
   (b) means for integrally bonding said two panels together along mating beveled edges and where a truncated top sits into an intersection of crossing channels, so as to form the core structure into a composite integral structure.

2. A pyramidal core structure as recited in claim 1 that further comprises;
   (a) at least one sheet, said at least one sheet in engagement with an exterior surface of the core structure; and
   (b) means for integrally bonding said at least one sheet to the core structure so as to form a structural panel with at least one sheet surface absent of voids.

3. A pyramidal core structure as recited in claim 2 wherein said means for integrally bonding two panels together and said means for integrally bonding said at least one sheet to the core structure comprises adhesive material.

4. A pyramidal core structure as recited in claim 3 wherein the pyramid shapes are formed in each said panel, depending on material and usage by either compression, injection, vacuum molding, die forming, dip molding, spray molding and any other method that will result in the basic form.

5. A pyramidal core structure a recited in claim 4 whereby the core structure can be formed in simple, compound, and complex curved surfaces with the core structure being of uniform thickness by changing face angles and size and shape of the pyramid bases in appropriate amounts as the geometry of said surfaces requires.

6. A pyramidal core structure as recited in claim 4 whereby the thickness and curvature of the core structure may be varied by changing the face angles, the size and shape of the pyramid bases and altitude of the pyramids as the geometry of said structure requires.

7. A pyramidal core structure as recited in claim 1 further comprises foam of low thermal conductivity to be filled within voids of the core structure to provide thermal insulation thereof.

8. A method of fabricating a pyramidal core structure, which comprises:
   (a) forming two continuous hollow pyramidal shaped embossed panels, each panel having continuous hollowpyramid shapes embossed in both longitudinal and latitudinal directions to define four-sided embossments with orthogonal narrow channels between them crossing at intersections, each of the pyramid shapes having slightly beveled edges at all four corners and a slightly truncated top so that one of said panels can be inverted and mated in either of two orthogonal directions with the other of said panels;
   (b) mating said panels with each other in an appropriate manner in either of two orthogonal mating orientations to form a core structure; and
   (c) bonding said panels together when mating.

9. A method of fabricating a pyramidal core structure as recited in claim 8, which further comprises: bonding at least one single sheet of material to said pyramidal core structure.

* * * * *